UNITED STATES PATENT OFFICE.

WILLIAM ELMER, OF NEW YORK, N. Y.

IMPROVEMENT IN THE MANUFACTURE OF INFLAMMABLE GASES FOR FUEL, &c.

Specification forming part of Letters Patent No. 106,569, dated August 23, 1870; antedated August 12, 1870; reissue No. 5,284, dated February 18, 1873.

*To all whom it may concern:*

Be it known that I, WILLIAM ELMER, of the city, county, and State of New York, have invented a new and useful method or process of eliminating in an isolated and gaseous condition the heat-producing elements contained in ordinary fuel and in other substances. These isolated and gaseous elements are intended to be used for heating purposes instead of ordinary fuel, and for other uses to which they may be applicable; and I do hereby declare that the following is a full, clear, and exact description of my said invention.

In my specification contained in certain Letters Patent granted to me by the United States, and dated the 13th day of February, 1869, I there represented the process of gasifying fuel by employing retorts set in a horizontal position, and which retorts were divided through the center by means of a partition. This arrangement of retorts answered very well the purpose for which it was intended, but not as perfectly as the arrangement and process hereinafter described.

In order to give a clear understanding of the nature and object of my present invention, I deem it necessary to make some more particular statements as to the effect of heat upon the products given off from ordinary fuel when subjected to the process of distillation, and the reactions and other effects produced by the application of high heat to the products of the destructive distillation of such ordinary fuel in order that the nature and extent of my improvement may be fully comprehended.

The materials usually employed in the production of artificial heat are coal, wood, and peat, which, though very dissimilar in appearance, are composed mainly of the same elements—namely, carbon, hydrogen, oxygen, and small but variable proportions of nitrogen, sulphur, and other elements, which constitute the ash when fuel is burned; but of all these elements two only in their union with oxygen by combustion can take any part in the production of heat; these are carbon and hydrogen. The other elements in fuel are very objectionable, because, being in combination with the heat-producing elements, they reduce the available quantity of these substances, and in combustion they enter into new combinations, which again reduce the heat-producing elements, while the compounds thus formed become the vehicle for the transmission of a large share of the heat from the point of ignition to the surrounding atmosphere, so that the actual calorific effects of the combustion of ordinary fuel are by this means reduced to a mere nominal power; besides, most of the heat thus generated as ordinarily used is carried off by the flues and lost for practical purposes, so that the actual quantity of heat utilized from ordinary fuel is only about ten per cent. of the whole amount that the heat-producing agents are capable of yielding. To obviate these objections so far as to utilize the heat-producing elements contained in fuel, I propose to eliminate these in the form of gases. To accomplish this object, I subject the fuel intended to be used as gas-stock to a series of distillations out of contact with the atmosphere, and decompose and convert such of the distillates as contain the heat-producing elements that are condensable and non-inflammable into inflammable gases.

It is well known that when bituminous and cannel coal are subjected to the process of distillation at a low red heat (700° to 800° Fahrenheit) they yield a variety of compounds, among which are aqueous vapors, free hydrogen, carbureted hydrogen, carbonic acid, light volatile hydrocarbons condensable into spirit or oil; and as the distillation goes on other condensable oils of different specific gravities are given off, and among which are heavy oils and what is called dead-oil, which mix mechanically with other products and settle to the bottom of the receiving-vessel, and the compound thus formed is called tar. The nitrogen and sulphur present enter into new combinations, producing ammoniacal and sulphur compounds. In the retort there finally remains a quantity of fixed carbon or coke containing the ash, which usually consists of silica, alumina, lime, and the oxides of manganese, iron, and some other substances. The condensable distillates, which constitute the principal product of the coal, subside in the receiver into different stratums, according to their specific gravities.

If the coal be subjected to higher temperatures than those referred to, the products of distillation are somewhat changed, a larger volume of gases is produced, and less condensable matter, and, consequently, more carbon remains in the retort.

When bituminous and cannel coals are subjected to the process of distillation under a full white heat the products are chiefly hydrogen, light carbureted hydrogen, and carbonic oxide. Bisulphide of carbon, sulphureted hydrogen, ammonia, cyanogen $N\ C_2\ C\ Y$, and sulphocyanogen $C_2\ N\ S_2\ C\ Y\ S_2$ are also formed. The amount of carbonaceous matter left in the retort under a white heat is much larger than under a red heat. Under the latter temperature from forty to forty-five per cent. of the carbon contained in the coal remains in the retort, while under a white heat from sixty-five to seventy per cent. remains.

It is evident, from the products obtained from the distillation of coal under various temperatures, that neither a high nor low heat alone is suited to the process of eliminating and gasifying the heat-producing elements contained in coal. Under the former the products given off from the coal are mostly gaseous and solid; under the latter, fluid and solid. The gases produced under a high heat alone, though much larger in amount than under a low heat alone, seldom amount to more than ten thousand cubic feet to the ton of coal. Besides, the compounds produced other than gaseous hydrocarbons under both a high and low heat are not only numerous but are wholly unfitted for the production of heat.

An example of what occurs in the distillation of bituminous coal under different temperatures is afforded in the manufacture of illuminating-gas. The process of the distillation of coal, as ordinarily practiced in the manufacture of illuminating-gas, is attended with the production of a great variety of compounds other than illuminating-gas, and hence the results, both to the manufacturer and the consumer, are unsatisfactory. With a low heat the quantity of gas produced is small, though its luminosity is good. With a high heat a larger quantity is produced, yet its luminosity is very poor, while a medium temperature is attended with neither economy nor the production of a gas of a satisfactory quality. Hence, in either case, the result is a costly product to consumers.

Wood and peat subjected to the process of distillation under various temperatures yield similar products to those obtained from bituminous coal.

In the distillation of wood the following are obtained: Light carbureted hydrogen, hydrogen, hydrocarbons of the olefiant-gas series, carbonic oxide, carbonic acid, pyroligneous or impure acetic acid, eupione, pyroxanthine, paraffine, creosote, oxyphenic acid, pittacal, ammonia, aqueous vapor, volatile and fixed oils, wood-tar; and charcoal, which contains the ashes or inorganic constituents, is left in the retort.

*Products from the Distillation of Peat.*

Light carbureted hydrogen, hydrogen, carbonic acid, carbonic oxide, hydrocarbons of the olefiant-gas series, volatile and fixed oils, paraffine, creosote, acetic acid, ammonia, sulphate of ammonia, pyroxylic spirit or wood naphtha, aqueous vapor, peat-tar; and charcoal remains in the retort.

*Analysis of crude fuel.*

The analysis of the chief products given off from different kinds of crude fuel by distillation under various temperatures shows that they are constituted as follows:

First, gaseous products—hydrogen and hydrocarbons: Hydrogen, $H$; light carbureted hydrogen, $C_2\ H_4$; olefiant gas or ethylene, $C_4\ H_4$; acetylene, $C_4\ H_2$; propylene, $C_6\ H_6$; butylene or tetrylene, $C_8\ H_8$.

Second, liquid products—light oily hydrocarbons: Benzole, $C_{12}\ H_6$; toluol, $C_{14}\ H_8$; cumol, $C_{18}\ H_{12}$; cymol, $C_{12}\ H_{14}$; photogen, light paraffine oil, and other hydrocarbon oil of the paraffine series.

Third, solid hydrocarbon products: Paraffine, $C_{30}\ H_{62}$; naphthaline, $C_{20}\ H_8$; paranaphthaline, $C_{30}\ H_{12}$; pyrene, $C_{30}\ H_6$; crysene, $C_{30}\ H_{10}$.

Fourth, nitro-hydrocarbon, mobile oily products: Aniline, $C_{12}\ H_{12}\ N$; chinoline, $C_9\ H_7\ N$; leucolene, $C_{18}\ H_8\ N$; picoline, $C_{12}\ H_7\ N$; pyridine, $C_5\ H_5\ N$; toluidine, $C_{14}\ H_9\ N$.

Fifth, ammoniacal compounds: Carbonate of ammonia, $N\ H_4\ O\ C\ O_2$; sulphate of ammonia, $N\ H_4\ O\ S\ O_2$; hydrosulphate of sulphide of ammonium, $N\ H_4\ S + H\ S$.

Sixth, sulphureted-hydrogen gas, $H\ S$.

Seventh, bisulphide of carbon, (liquid,) $C\ S_2$.

Eighth, gaseous oxides of carbon: Carbonic oxide, $C\ O$; carbonic anhydride, $C\ O_2$.

Ninth, carbolic acid—phenol, $C_{12}\ H_6\ O_2$.

Tenth, aqueous products—water, $H\ O$.

First series.—The gaseous hydrocarbons, when passed through tubes heated to a full redness, are decomposed, and deposit all but one equivalent of their carbon, and light carbureted hydrogen is formed. If the latter compound be passed through tubes heated to an intense whiteness, it is also decomposed, its carbon is deposited, and a volume of hydrogen double that of the original gas is liberated.

Second series.—The light oily hydrocarbons, when distilled at a red heat, deposit a portion of their carbon, and are converted into gaseous hydrocarbons of the oily series $C_8\ H_8$. Each volume of these gaseous compounds, as its vapor density proves, contains double the proportions of carbon and hydrogen existing in olefiant gas. When these gases are passed through highly heated tubes, they are decomposed, depositing all but one equivalent of their carbon, and double their volume of light carbureted hydrogen is formed.

Third series.—The solid hydrocarbons, for the most part, may be distilled when subjected to a very high heat, but without much change in their composition. When distilled at a white heat in contact with highly-heated steam they are decomposed, and a rearrangement of their elements occurs; a large proportion of their carbon is deposited, and hydrocarbon gases are formed of the ethylene series $C_4 H_4$; the oxygen of the steam combines with a portion of the carbon, to form carbonic oxide while the hydrogen of the steam is set free. The hydrocarbon gases of this series, like olefiant gas, are decomposed when passed through highly-heated tubes, forming light carbureted hydrogen and depositing carbon.

Fourth series.—When the vapor of nitrohydrocarbons is passed through highly-heated tubes carbon is deposited, ammonia and a small quantity of hydrocyanic acid are given off, and a dense hydrocarbon liquid remains in the receiver. If this liquid be subjected to a white heat in contact with highly-heated steam, similar results occur to that described in the decomposition of the compounds of the third series.

Fifth series.—Carbonate of ammonia is volatilized by heat, and, when passed through a heated tube with steam, it is decomposed, a portion of the ammonia and carbonic acid is evolved, and a solution of a single carbonate remains. When sulphate of ammonia is subjected to a temperature of only 536° Fahrenheit it is decomposed, nitrogen and ammonia are liberated, and sulphite of ammonia and water are formed. Hydrosulphate of sulphide of ammonia is decomposed when passed through highly-heated tubes, a small quantity of sulphur is deposited, and ammonia and sulphureted hydrogen are liberated.

Sixth series.—Sulphureted hydrogen is decomposed when the gas is passed through a tube heated to full redness, the sulphur is deposited in the receiver, and the hydrogen is set free.

Seventh series.—The vapor of bisulphide of carbon is decomposed when passed through tubes heated to whiteness with intensely-heated steam. The oxygen of the steam unites with the carbon to form carbonic oxide, and the hydrogen with the sulphur to form sulphureted hydrogen, which is decomposed by heat, as above stated.

Eighth series.—Carbonic oxide remains unchanged when passed through tubes heated to the highest intensity. Carbonic anhydride, (acid,) when passed through tubes filled with carbon highly heated, is decomposed and converted into carbonic oxide.

Ninth series.—Carbolic acid is decomposed only to a limited extent when passed through a red-hot tube, yielding a small quantity of solid olefiant gas, (naphthaline;) but when passed, with highly-heated steam, through a tube heated to whiteness it yields a variety of compounds, among which are oxides of carbon, free carbon, and hydrocarbon gas, identical with olefiant gas. This gas burns with a white smokeless flame, of peculiar splendor and brilliancy.

Tenth series.—Aqueous vapor, as is well known, is decomposed when passed through a tube filled with small shavings or strips of iron heated to a bright redness; also when highly-heated steam is brought in contact with the vapor of metallic zinc; likewise when highly-heated steam is brought in contact with incandescent carbon. In the former cases the oxygen of the steam combines with the metals, forming solid oxides, while the hydrocarbon is liberated. With the latter the oxygen unites with the carbon to form the gaseous oxides of carbon, while the hydrogen is set free.

Eleventh series.—Substances obtained from the distillation of wood and peat: Acetic acid $C_2 H_3 O_2 H$. When vapor of acetic acid is passed through a red-hot tube a portion is decomposed, yielding free carbon and combustible gases, acetone, naphthaline, hydrate of phenol, and benzole. If the vapor of acetic acid be passed through carbon in a highly-heated tube it is entirely decomposed, yielding hydrocarbon gases and carbonic oxide. Acetone, $C H_6 O_2$, when passed in a state of vapor through a red-hot tube, deposits carbon, and is converted into a peculiar oil called dumasin. This oil, when passed over incandescent carbon, is converted into inflammable gases. Eupione, $C_5 H_{12}$. The vapor of eupione is decomposed when passed through a highly-heated tube, yielding hydrocarbon gases. Methylic alcohol, $C_2 H_4 O_2$, syn., wood naphtha, pyroxylic spirit. The vapor of methylic alcohol, passed through a red-hot tube, yields olefiant gas and aqueous vapor. Pyroxanthine, $C_5 H_8 O_2$, when highly heated, is decomposed, depositing carbon and yielding inflammable gases and aqueous vapor. Creosote, $C_{24} H_{16} O_4$. The vapor of creosote, when passed through a tube heated to whiteness, is decomposed, depositing carbon and yielding inflammable gases and aqueous vapor. Oxyphenic acid, $C_6 H_6 O_2$, is decomposed when its vapor is passed through carbon in a tube heated to whiteness. Carbonic acid and propylene are produced.

There are a few other compounds resulting from the distillation of crude fuel, but not of sufficient importance to our present object to require notice.

From the foregoing statement it is evident that the products, excepting the permanent gases, resulting from the distillation of the various kinds of crude fuel may be decomposed, and the heat-producing elements they contain isolated and converted into permanent inflammable gases. But the heat-producing elements contained in crude fuel may be more conveniently and effectually eliminated in the gaseous condition by subjecting the distillate to the high heat named herein while in the form of vapor and before it has lost the heat it has acquired, so as to avoid the formation of the compounds named by condensation. At a lower heat some of the products escape decomposition, and, upon cooling, condense and appear in the form of tar, ammonia, &c., containing, as an element, hydrogen, which a higher heat would have liberated.

The object of my present invention is to effect the submission of these products of the distillation to the action of the high heat named, with greater certainty, convenience, and effect than have hitherto been attained.

The method pursued and the apparatus employed are as follows: The bench for holding the retorts is made in the usual form. One of the retorts is set in the bench in a horizontal position, as is usual in gas-works. The other two retorts are set in a vertical position, one on either side of the horizontal retort. The latter retort I have, for convenience, denominated the receiving-retort, as the fuel to be subjected to the process is placed in this retort, which is made larger than the vertical retorts. The vertical retorts are made in the form of a boot—that is, the lower end of these retorts, when placed in position, turn outward and protrude through the wall of the bench in order to admit the attachment of mouth-pieces to the retorts, so that when the mouth-piece is also attached to the receiving-retort the bench presents the appearance of an ordinary bench of three retorts. The receiving-retort is connected with one of the vertical retorts by means of a pipe inserted into the mouth-piece of both. The two vertical retorts are connected with each other at the top of the bench by means of a pipe. To the mouth-piece of the vertical retort not connected with the receiving-retort is attached the stand-pipe to convey the gas from the retorts to the hydraulic main. The two vertical retorts are filled with small pieces of fire-brick or other suitable substance indestructible by heat. These retorts must be kept at a white heat of not less than 2000° Fahrenheit, and, preferably, from 2,500° to 3,000°. The crude fuel or material subjected to the process of volatilization is first placed in the receiving-retort, where it is subjected to the process of distillation under a red heat of from 800° to 1000° Fahrenheit, according to the nature of the material employed. The volatile products, as eliminated from this material, are conveyed directly into the vertical retort connected with the receiving-retort and pass up through the white-hot material contained in this retort. The object of the material in the vertical retorts is to divide the volatile products into infinitesimal particles or streams, and to retain in the retorts the free carbon and solid hydrocarbons by filtration, so that none of these substances go over with the gases from the retorts.

It is obvious that from the position of the material in the vertical retort no gas or vapor can traverse the retort without passing through and being brought in contact with the white-hot surfaces of the particles of the mass, whereas in a horizontal retort coke, coal, broken bricks, or any other comminuted material, however compactly the retort may be filled with it, is liable to settle down and leave a vacant space at the top, through which gas and vapors may pass without contact. By this means the volatile hydrocarbons given off by distillation from the materials employed are decomposed, depositing free carbon and solid hydrocarbons of the third series and forming a variety of gases of different specific gravities. These gases, with more or less vapors, which have escaped decomposition in the first vertical retort, pass from this retort through the connecting-pipe into and down through the other vertical retort when a second vertical retort is used, where, in their passage through the incandescent material contained in this retort, they again deposit a portion of their carbon and are converted into permanent inflammable gases. The aqueous vapor formed in the receiving-retort is also decomposed in the first vertical retort, where it comes in contact with carbon deposited there, and which, under the high heat, has become incandescent. Both carbonic oxide and carbonic acid are formed in the decomposition of the aqueous vapor by carbon, and the hydrogen of the steam is set free, while the carbonic acid is decomposed in its passage through the incandescent carbon deposited in the second vertical retort, and is changed into carbonic oxide. When the material subjected to distillation in the receiving-retort ceases to give off gaseous and volatile products, then steam heated to redness may be admitted in small and regulated quantities into this retort, where a portion of it is decomposed, forming the oxides of carbon and liberating hydrogen, but the greater portion of the steam passes on in contact with the free carbon and solid hydrocarbons, remaining in the vertical retorts, where a rearrangement of the elements of steam and the solid hydrocarbons and free carbons takes place, and which results in the formation of permanent inflammable gases of different specific gravities.

The hydrocarbons of the third series are principally formed in the receiving-retort and volatilized by heat, and hence are displaced by distillation with the other volatile products and carried into the vertical retorts, where they are partially decomposed, giving up a portion of the hydrogen they contain and become solid, and are deposited in these retorts where they are no longer volatilized by heat, but may be transformed into inflammable gases by highly-heated steam, as above stated. It is these compounds that are so annoying and troublesome to the manufacturers of illuminating-gas. They are given off from coal by distillation with other products and become deposited in the stand-pipes, often filling them up solid. These deposits have to be removed with bars of iron and are a dead waste in the ordinary manufacture of illuminating-gas, and yet they are composed of carbon and hydrogen—the very materials essential to the production of gas, but cannot be utilized in the ordinary process of gas-making.

By my invention these compounds are wholly utilized, as well as the product known as coal-tar, by conversion into permanent inflammable gases.

*Advantages of the New Process of Gas Manufacture.*

First. By the new process a ton of gas-coal will yield from eighty to eighty-five thousand cubic feet of gas, when the solid carbon is also converted into carbonic oxide and hydrogen by the decomposition of steam; whereas the ordinary yield of illuminating-gas from the same quantity of coal is scarcely ten thousand cubic feet.

Second. The receiving-retort is designed to hold a ton or more of coal at a single charge, which is placed in the retort by machinery so quickly that little or no loss of gas occurs. At the same time a great saving of labor and time is effected.

Third. The receiving-retorts require charging only three times in twenty-four hours; whereas, in the manufacture of illuminating-gas, as ordinarily conducted, the retorts are charged about every four hours, which is very destructive to the retorts from the frequent introduction of cold material into them while highly heated.

Fourth. By the new process all the coal-tar and other heavy hydrocarbons, and free carbons not utilized in the ordinary manufacture of illuminating-gas, are converted into permanent inflammable gases.

Fifth. The gas manufactured by the new process contains very few impurities, and these in small quantities only. It is evident that it could not contain more than one-eighth the amount of impurities existing in ordinary illuminating-gas, as eight times the quantity of gas is made by the new process from a given quantity of coal, as is made by the ordinary process of making illuminating-gas. Not only is this the case, but the sulphureted hydrogen, bisulphide of carbon, and most of the ammoniacal compounds formed in the distillation of coal, are decomposed in the vertical retorts, and the hydrogen they contained set free, while the carbonic acid is converted into carbonic oxide, a gas as inflammable as hydrogen, and both of which add to the volume of gas produced. The purification of the gas made by the new method will, therefore, cost less than one-eighth that of illuminating-gas as ordinarily made.

Sixth. It is evident that, as eight times the quantity of gas is made by the new process over the old, much less room for the storage of coal is required, and much less capital to conduct the business. There is also no tar to dispose of, or deposit of solid carbon or other material to remove from the retorts and pipes in the manner practiced in the old process of gas manufacture; besides, the new method is in nowise a nuisance to the neighborhood in which the gas is produced.

Seventh. The gas produced by the new process, though consisting of a variety of gases of different specific gravities, becomes (according to the well-known law of diffusion of gases) perfectly mixed — that is, they intermingle with each other throughout the entire body of the gas, so that the free hydrogen present, though lightest of all the gases, exists in uniform proportions throughout the entire gaseous body.

These gases are also permanent in their character, and, therefore, not condensable by cold or ordinary pressure in the holder or pipes, as is the case with the luminiferous constituents of ordinary coal-gas, which constitutes a very serious waste of the very best light-producing elements existing in the gas.

*Advantages and Economy of Inflammable Gases Over Ordinary Fuel.*

It is a well established fact that a small proportion only of the heat-producing elements is utilized in the use of ordinary fuel. This is the result of imperfect combustion of these elements. Perfect combustion of fuel cannot be obtained without flame, and no form of fuel can be made to produce flame unless first converted into gas. The temperature of an ordinary fire from bituminous coal, wood, or peat is too feeble to convert the entire volatile products of these substances into gas, and hence a very large proportion of the heat-producing elements they contain is wasted.

The burning of wood, peat, or bituminous coal, as ordinarily practiced, is a process of simple distillation in contact with the atmosphere by which the fuel is mainly converted into smoke, aqueous vapor, hydrocarbon vapors, and gases.

These vapors and unoxidized carbon or smoke and carbonic acid, when mingled with the inflammable gases generated, so far envelop them as to partially obstruct the free contact of the oxygen of the atmosphere with the gaseous body, so that a partial combustion only of the inflammable gases themselves takes place, while the vapors and smoke not only escape combustion but also become a vehicle for the transmission of a portion of the heat by the flue.

In burning anthracite coal, charcoal, or the coke of gas-houses, a flame is produced whenever the supply of oxygen is sufficient to form carbonic acid beneath the mass of ignited coal. The first effect of combustion of anthracite coal is a glow of flame, the form of which is scarcely visible, and, as the carbonic acid passes up through the red-hot coal, it is changed into carbonic oxide, by taking up an additional quantity of carbon equal to that it already contained. This gas, when exposed to the free action of the atmosphere, takes fire above the bed of coal, and burns with a visible flame; but, if the supply of oxygen is insufficient to form carbonic acid at the bottom of the ignited coal, then a slow combustion takes place, resulting directly in carbonic oxide, which, without a sufficient supply of oxygen, escapes combustion, and is carried off by the flue and wasted, as a heat-producing agent, as truly so as though it were wood or coal scattered to the winds by a continuous process; so that the ordinary use of even anthracite coal forms no exception to the rule of imperfect combustion and consequent waste of the heat-producing elements contained in crude fuel. To economize the heat-producing elements contained in ordinary fuel, they must first be isolated in the gaseous form out of contact with the atmosphere, and afterward burned, so as to secure perfect combustion, which results in the formation of carbonic acid and aqueous vapor.

The gas made by the new process is dry and perfectly free from condensable matter of every kind, and, therefore, capable of rapid and perfect combustion, producing, without dust, soot, or ashes, a hot smokeless flame that may be disposed of at will by merely turning off the gas when the heat is not required.

A great number of burners and other appliances for the use of inflammable gases as a source of heat is already in existence, and new inventions for this purpose are almost daily added to the list, and, therefore, it is not necessary here to describe any particular method for burning inflammable gases. The gas made by the new method may be conveyed through pipes to customers the same as illuminating-gas, and is applicable to industrial pursuits, and also to all the various purposes of domestic life requiring artificial heat. It may be compressed and used in locomotives with great economy and convenience, and by which the terrible nuisance of smoke, cinders, and poisonous gases, which produce so much discomfort and sickness among passengers in rail-cars, may be avoided. The gas generated on board of ocean steamers, and used for generating steam, and for other purposes requiring heat, would be the means of an immense saving of coal, as it would not require half the quantity that is now used to produce the same results.

By the new process, the gas may be made so as to be wholly free from bicarbureted hydrogen, and, in this form, well adapted to metallurgical and chemical purposes, especially in connection with oxygen in producing the oxyhydrogen flame.

With the recent facilities for obtaining oxygen, this gas may be employed for the production of the oxyhydrogen light so cheaply that this light may be employed for many purposes with great economy and convenience.

*Claims.*

What I claim as my invention, and desire to secure by Letters Patent, is—

The process herein described of manufacturing gas-fuel from bituminous coal or equivalent crude fuel, by subjecting its distillates to the action of high heat, not less than 2000° Fahrenheit, in the manner and by the means herein specified, whereby such distillates are decomposed into hydrogen and carbonic oxide.

Witness my hand this 8th day of November, 1872.

WILLIAM ELMER.

Witnesses:
J. P. FITCH,
A. LIVINGSTON MILLS.